(12) United States Patent
Abraham et al.

(10) Patent No.: US 6,880,115 B2
(45) Date of Patent: Apr. 12, 2005

(54) SURVEILLANCE OF QUALITY OF SERVICE IN A DIGITAL TELEVISION LINK

(75) Inventors: Denis Abraham, Nancy (FR); Jean Ribeiro, Metz (FR); Fabien Michaut, Nancy (FR)

(73) Assignee: Telediffusion de France, Paris (FR)

( * ) Notice: Subject to any disclaimer, the term of this patent is extended or adjusted under 35 U.S.C. 154(b) by 368 days.

(21) Appl. No.: 10/142,893

(22) Filed: May 13, 2002

(65) Prior Publication Data

US 2002/0149675 A1 Oct. 17, 2002

Related U.S. Application Data

(63) Continuation of application No. PCT/FR00/03108, filed on Nov. 8, 2000.

(30) Foreign Application Priority Data

Dec. 13, 1999  (FR) .............................. 99 15926

(51) Int. Cl.$^7$ ....................... G01R 31/28; H03M 13/00; H04N 17/02
(52) U.S. Cl. ........................ 714/712; 714/746; 348/192
(58) Field of Search ............................... 714/712, 746, 714/750, 752, 758; 348/192, 462; 370/241, 395; 375/224

(56) References Cited

U.S. PATENT DOCUMENTS

| | | | | |
|---|---|---|---|---|
| 4,800,562 A | * | 1/1989 | Hicks | 714/704 |
| 5,359,609 A | * | 10/1994 | Bonnifait et al. | 714/712 |
| 6,549,757 B1 | * | 4/2003 | Masse et al. | 455/67.13 |

FOREIGN PATENT DOCUMENTS

| WO | WO98/17024 | 4/1998 |
|---|---|---|
| WO | PCT/FR00/08108 | 8/2000 |

OTHER PUBLICATIONS

M. Trauberg, et al., "Die Protokollanaylse: Eine neue Anfordering (etc.)," Fernseh–und Kino–Technik, DE, VDE Verlag GmbH, vol. 50 No. 10, Oct. 1, 1996, pp. 570–572 and 576–577.
P. Siebert, et al., "Überwachung von DVB–S–Ausstrahlungen," Fernseh–und Kino–Technik, vol. 51, No. 7, Jul. 1, 1977, pp. 416–422.
J. O. Noah, "A Rational Approach to Testing MPEG–2," IEEE Spectrum, U. S., IEEE, Inc., N.Y., vol. 34, No. 5, May 1, 1997, pp. 67–72.
ETR 290 ETSI Technical Report "Digital Video Broadcasting (DVB); Measurement Guidelines for DVB Systems," May, 1997.

* cited by examiner

*Primary Examiner*—Shelly A Chase
(74) *Attorney, Agent, or Firm*—Lawrence E. Laubscher, Sr.

(57) ABSTRACT

The quality of service in a digital television link is monitored cyclically by means of an analyzer which analyzes the transport stream packets to deduce therefrom many standardized analysis parameters which are complex to interpret. The invention minimizes the number of measurements of these parameters by preselecting first and second analysis parameters and periodically determining a first maximum for variations from the first selected parameters and a second maximum for variations from the second parameters selected to deduce therefrom, respectively, a first parameter which is representative of the synchronization relative to the equipment units in the link and at least one second parameter which is representative of a degradation in a link.

6 Claims, 3 Drawing Sheets

SURVEILLANCE OF QUALITY OF SERVICE IN A DIGITAL TELEVISION LINK

REFERENCE TO RELATED APPLICATION

This application is a continuation of the PCT International Application No. PCT/FR00/03108 filed on Nov. 8, 2000, which is based on the French Application No. 99-15926 filed on Dec. 13, 1999.

BACKGROUND OF THE INVENTION

The present invention concerns surveillance of the quality of service in a digital television link and more particularly in a digital television signal conforming to the MPEG-2 (Moving Picture Expert Group) and DVB (Digital Video Broadcasting) standards.

DESCRIPTION OF THE PRIOR ART

At present, quality-of-service surveillance in links set up in a digital telephone network is based on three sets of measurements:

when the link to which the surveillance is applied is a terrestrial communication link or a link between a satellite and a terrestrial broadcast station or a cable or ATM link, etc., measurements on the radio frequency signal after modulation of the digital television signal; the bit error rate (BER) in the digital signal and the level of the radio frequency signal can be measured;

measurements on the transport stream (TS) of the digital television signal by measuring 19 parameters defined by the ETR 290 standard, "Measurement guidelines for DVB systems", ETSI, May 1997, using a syntax analyzer conforming to the MPEG-2 and DVB standards; and measurements on the audio and video components of the digital television signal services.

FIELD OF THE INVENTION

The invention is more particularly directed to measurements on the digital transport stream (TS) which, in the prior art, entail measuring at least nineteen parameters conforming to the ETR 290 standard. This large number of technically complex parameters are very difficult to interpret in order to obtain quickly a reliable estimate of the quality of service in a digital television network. In the event of an error, many alarms are logged and must be managed by the supervisory means, which then encounter problems in managing them in real time.

OBJECT OF THE INVENTION

The present invention aims to simplify the digital transport stream measurements by minimizing the number of measurements required and facilitating their interpretation. Thanks to this simplification the number of parameters to be taken into account and the cost of service quality surveillance are reduced.

SUMMARY OF THE INVENTION

Accordingly, a quality-of-service surveillance method for use in a transmission link of digital television signal, including cyclic analysis of transport stream packets constituting the signal to deduce therefrom a predetermined number of analysis parameters, is characterized by the following steps:

preselecting first analysis parameters and second analysis parameters, and periodically determining the maximum of the variations in the preselected first analysis parameters and the maximum of the variations in the preselected second analysis parameters to deduce therefrom, respectively, a first parameter representative of the synchronization relative to equipment units in the link and a second parameter representative of a degradation of services.

The first parameter representative of the synchronization of equipment units depends on three analysis parameters which are a transport stream synchronization loss parameter, a program association table error parameter and a program map table error parameter.

According to a first embodiment, the second parameter representative of a degradation of services depends on two analysis parameters which are a continuity count error parameter and a transport error parameter.

According to a second embodiment, the second parameter representative of a degradation of services depends on four parameters which are a cyclic redundancy code error parameter, a program clock reference error parameter, a network information table error parameter and a service description table error parameter.

The first and second embodiments can be combined so that three parameters are determined to evaluate the quality of service in a digital television network link, i.e. more generally in a digital television signal.

For example, a packet analysis cycle has a duration of approximately one second, and the period during which the first and second parameters respectively representative of the synchronization of equipment units and of a degradation of services are deduced is approximately ten seconds.

BRIEF DESCRIPTION OF THE DRAWINGS

Other features and advantages of the present invention will become more clearly apparent on reading the following description of a plurality of preferred embodiments of the invention, given with reference to the corresponding accompanying drawings, in which.

DETAILED DESCRIPTION OF THE INVENTION

Figure 1:
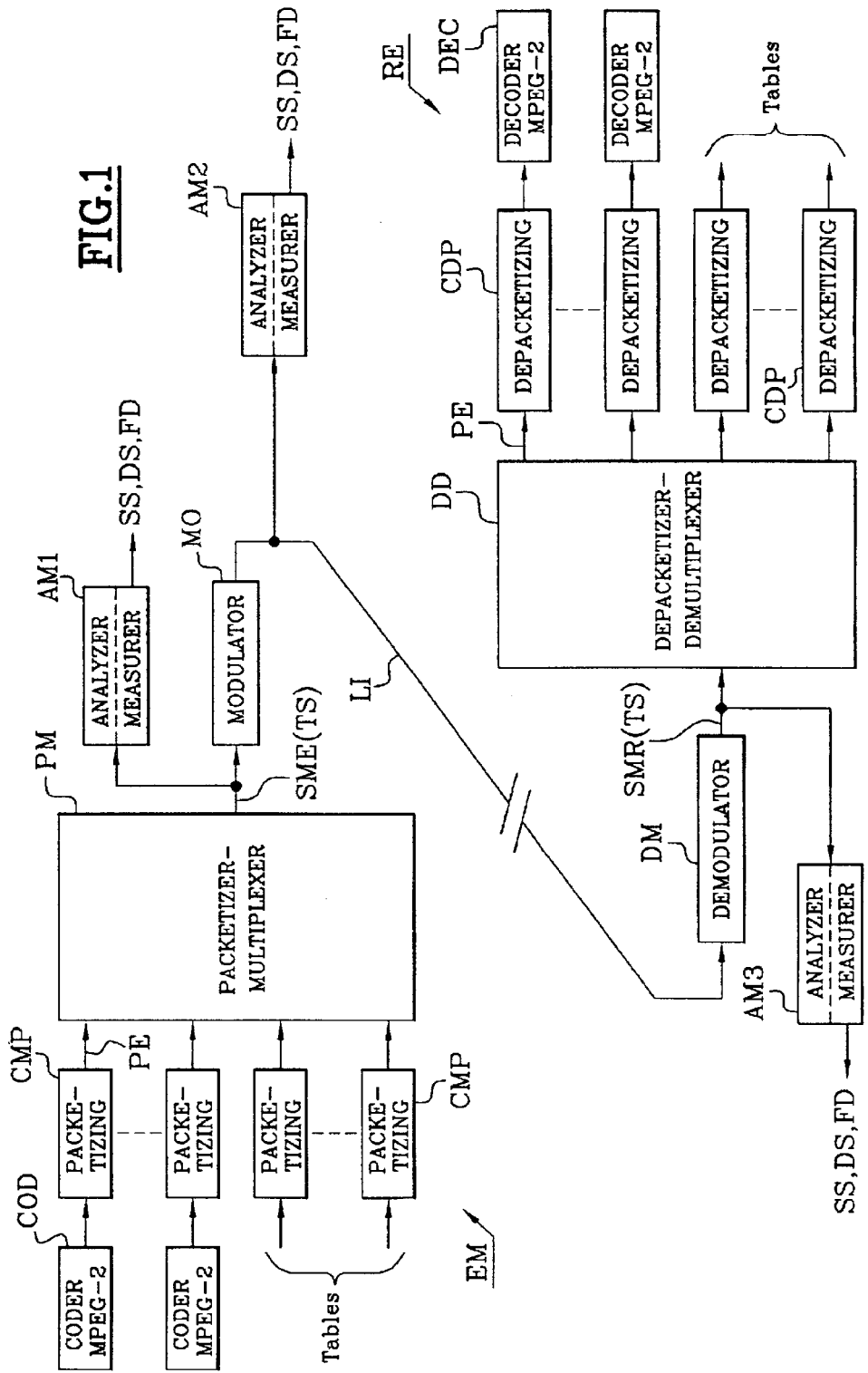
FIG. 1 is a block diagram between two ends of a link in a digital television network.

FIG. 1 shows diagrammatically a link LI for transmitting a digital television signal between an emitter EM and a receiver RE in a digital television network conforming to the MPEG-2 standard.

The emitter EM essentially comprises a plurality of elementary packetizing circuits CMP, a packetizer-multiplexer PM and a radio frequency modulator MO. The packetizer circuits CMP are connected to respective different sources constituting MPEG-2 coders and relating to components associated with audiovisual service programs, i.e. audio, video and data components, and to signaling table generators associated with these programs, with which the present invention is more particularly concerned.

The signaling expressed by Program Specific Information PSI tables specifies the signaling relating to the transport multiplex signal SME leaving the packetizer-multiplexer PM so that the receiver RE can identify the parameters and components needed to access the initial audiovisual service programs. The signaling tables include a Program Association Table (PAT) which matches a program number to an identifier PID of a table PMT identifying the components of the program and a Program Map Table PMT which matches variable descriptors PID of the components of a program and the primary characteristics thereof. The packetizing circuits CMP associated with the tables form the latter into elementary packets PE referred to as "sections" in the MPEG-2 standard.

The other packetizing circuits CMP associated with the audiovisual service program components also transmit the audio, video and data streams in the form of elementary packets PE.

Figure 2:
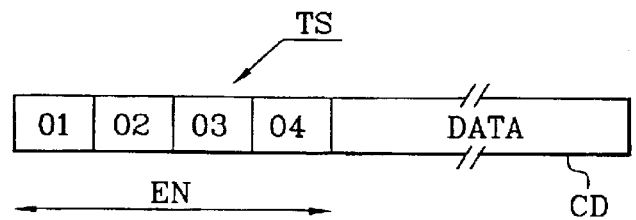
FIG. 2 shows the structure of a transport stream packet conforming to the MPEG-2 standard.

The elementary packets PE, which have varying lengths of several kilobytes, are divided into (Transports Stream) TS transport packets and multiplexed in the packetizer-multiplexer PM to constitute a digital television emit multiplex signal SME applied to the input of the modulator MO. The TS packets have a constant length, typically 188 bytes. Each TS packet is made up of a header EN with four bytes O1 to O4 and a data field CD of 184 bytes, as shown in FIG. 2. The first byte O1 of the header is a synchronization byte (Sync Byte) whose hexadecimal code value is normally equal to '47'. The first bytes in the emitted TS packets are used to synchronize MPEG-2 decoders in the receiver RE with the TS transport packets it receives. The first bit of the second byte O2 of the header is a transport error indicator bit which constitutes a flag for indicating the presence of erroneous bits in the corresponding packet.

The last five bits of the second byte O2 and the third byte O3 of the header contain a 13-bit table identifier PID conforming to the MPEG-2 standard or the DVB standard, as defined below. The last four bits of the fourth byte O4 of the header constitute a 4-bit continuity count relating to a counter that is incremented by one unit modulo 16 for each TS packet corresponding to the same identifier of a respective audiovisual service program.

The multiplex signal SME produced in this way by the packetizer-multiplexer PM modulates one or more carriers in the modulator MO, typically using quadrature amplitude modulation (QAM) or quaternary phase shift keying (QPSK). The channel code used in the modulator is a Reed Solomon code, optionally accompanied by a convolutional code, for example a Viterbi code. These variants are matched to the type of the digital television signal transmission link LI, which may be a cable link, a link between radio relay stations, or a broadcast link between terrestrial stations and a satellite.

In a reciprocal manner to the emitter EM, the receiver RE includes a demodulator DM connected to the +link LI and producing TS transport packets constituting a received digital television multiplex signal SMR equivalent to the emitted multiplex signal SME, and then a demultiplexer-depacketizer DD for demultiplexing the received TS transport packets and reconstituting the elementary packets PE, which are applied to respective depacketizing circuits CDP. The circuits CDP partly feed audio, video and data components to MPEG-2 audiovisual service program decoders and partly apply received elementary packets PE (sections) relating to the signaling associated with the programs to signaling table recovery circuits which reconstitute the signaling tables in the receiver.

The link LI between the emitter EM and the receiver RE is monitored by an analyzer/measurer AM as shown in FIG. 1. The analyzer/measurer AM includes, on the one hand, a prior art analyzer for analyzing the syntax in a transport stream according to the MPEG-2 standard, and to be more precise for measuring the nineteen analysis parameters defined in the aforementioned ETR 290 standard, and a measurer for implementing the link quality surveillance method according to the invention. The analyzer is typically a DVMD stream analyzer (MPEG2 measurement decoder) marketed by German firm RHODE & SCHWARTZ.

The measurer uses nine of the nineteen analysis parameters supplied by the analyzer. The nine parameters were selected from among the nineteen parameters conforming to the ETR 290 standard so that they can be combined, in accordance with the invention, into three parameters SS, DS and FD representative of quality criteria of a digital television signal link, after testing several ten combinations of the 19 parameters of the ETR 290 standard on several hundred digital television signal sequences.

In practice, the analyzer/measurer analyzes the packet transport stream (TS) in the emitted multiplex signal SME between the packetizer-multiplexer PM and the modulator MO in the transmitter EM, as shown at AM1 in FIG. 1, or in the received multiplex signal SMR between the demodulator DM and the demultiplexer-depacketizer DD in the receiver RE, as shown at AM3 in FIG. 1, or analyzes the transport stream at the level of the link LI between the modulator MO and the demodulator DM, as shown at AM2 in FIG. 1, in which case a demodulator (not shown) is provided at the input of the analyzer.

The nine analysis parameters in accordance with the ETR 290 standard used by the quality-of-service surveillance method according to the invention are defined hereinafter. Each analysis parameter constitutes an error count that is incremented by one unit each time that the analyzer detects in the TS packet stream an error associated with the parameter. The analyzer is capable of detecting at most one error associated with a parameter in each analysis cycle, this cycle typically having a duration of approximately one second. This means that the value of a parameter at time t is equal to the number of analysis cycles during which errors associated with the parameter have been signaled, beginning at the stream analysis start time. For example, for a given parameter, the analysis begins at t=10 h, and the parameter counter in the analyzer is set to zero. Errors occur during a period of 0.5 s at 10 h 01 min and during a continuous period of 10 seconds from 10 h 02 min. The analyzer signals:

from 10 h to 10 h 01 min: that no errors are detected, and the parameter is equal to zero;

from 10 h 01 min 00 s to 10 h 01 min 01 s: that errors are detected during a period of one second and that the parameter is incremented by one unit;

from 10 h 02 min 00 s to 10 h 02 min 10 s: that errors are detected continuously and that the parameter is incremented by one unit every one second.

1) The first parameter, Transport Stream Synchronization Loss (TSSL), relates to loss of synchronization in the transport stream, i.e. in the TS packets, in particular of the multiplex signal SME or SMR. As already stated, the first byte O1 in a TS packet (FIG. 2) normally has the hexadecimal value '47'. Synchronization is established in the receiver RE when the demultiplexer-depacketizer DD detects five normal first bytes in five consecutive TS packets. Synchronization is considered to have been lost or not to have been acquired if the receiver does not detect any or only one normal first byte in three consecutive TS packets; this condition is considered to constitute loss of synchronization.

The analyzer produces a parameter TSSL corresponding to each synchronization loss, i.e. when the first bytes of three consecutive TS packets contain at most only one correct packet equal to '47' in hexadecimal.

2) The Program Association Table (PAT) contains a list of all the audiovisual service programs in corresponding relationship with PID identifiers of Program Map Tables PMT associated with the programs and contained in the transport stream of TS packets of the multiplex signal SME, SMR. The PMT contain a detailed description of the programs, i.e. descriptors of the components of each program. The PAT is therefore essential for decoding an audio and video program. If the PAT table is invalid or contains errors, a decoder DEC in the receiver RE is incapable of selecting and decoding a transmitted program supported by the multiplex signal SMR.

The PAT table is transmitted by packets having PID identifiers equal to '00' in hexadecimal. A PAT table is divided in a packetizing circuit CMP into plural elementary packets PE of sections type each of 256 bytes maximum. Each section begins with a table identifier byte '00'.

A second parameter PATE signaling a PAT table error is produced by the analyzer in response to one of the following three events:

the PAT table identifier is different from '00'; or the PAT table is transmitted in an encrypted (scrambled) form; or the time interval between two consecutive PAT tables relating to the same program exceeds a time threshold ST which is typically equal to 0.5 s.

3) Program map tables (PMT) describe in detail respective audiovisual service programs identified in the PAT table. The essential information contained in a PMT table is the list of descriptors PID in all the TS packets relating to the audio, video and data components of a respective program, as well as the PID identifiers of TS packets used to transmit Program Clock Reference (PCR) values associated with the respective program for recovering the clock of the respective coder COD in the respective decoder DEC without using the clock of the link LI.

If a PMT table is invalid or contains errors, the respective decoder DEC is incapable of selecting and decoding the respective audiovisual service program in the multiplex signal SMR. The descriptors PID of the program components in the PMT table vary from '0010' to '1FFE' in hexadecimal. The PMT table can be divided into several elementary portions of section type, with a maximum of 256 sections, each section corresponding to an audiovisual service program. The identifier of the PMT table of each section, and thus of each program, is normally equal to '02'.

A third parameter PMTE is supplied by the analyzer in response to one of the following events:

the identifier of the PMT table is different from '02'; or the PT table is transmitted in an encrypted (scrambled) form; or the time interval between two consecutively transmitted PMT tables exceeds the time threshold ST typically equal to 0.5 s.

4) The four-bit continuity count contained in the fourth byte O4 of the header EN of a TS packet is the count from a counter in the packetizer-multiplexer PM that is incremented by one unity for each TS packet with the same identifier PID. The count of this counter varies from 0 to 15 modulo-16. The continuity count is used to mark missing packets of a program, or packets received more than once.

The MPEG-2 standard tolerates count discontinuities if they are indicated in the optional adaptation field (AF) of the packets concerned. This method is mainly used to eliminate error messages in the event of a change of program due to remultiplexing of the transport stream of TS packets.

A fourth parameter CCE signaling a continuity count count error is produced by the analyzer in response to one of the following three events:

the same TS packet has been received at least twice in the analyzer without being indicated in the AF field; or a TS packet is missing; or TS packets are not arriving in the correct order emitted.

5) The flag consisting of the transport error indicator bit included in the second byte O2 of the header EN of each TS packet is raised by Viterbi decoding or Reed Solomon decoding during demodulation in the demodulator DM to signal the inability of the corresponding error corrector code to correct all the errors. The corresponding decoder DEC must not interpret a packet flagged by this flag. In this case, the stream analyzer produces a fifth parameter called the transport error parameter, in the form of a bit TE at logic "1", and does not process the packet flagged by the flag.

6) The MPEG-2 standard provides three signaling tables which are the two previously referred PAT and PMT tables and a Conditional Access Table (CAT), and the Eurooean Digital Video Broadcasting (DVB) standard provides service channel tables, all of which tables are transmitted periodically. In particular, the service tables include a Network Information Table (NIT), an Event Information Table (EIT), a Service Description Table (SDT), a Bouquet Association Table (BAT) and a Time Offset Table (TOT). All these tables are transmitted in the form of elementary packets of section type. The end of each table section contains a checksum (CS) which is calculated in the emitter EM at the time of emission and in the receiver RE at the time of reception, in accordance with a Cyclic Redundancy Check (CRC) introduced conventionally into each section as a function of the information field thereof, and which enables the receiver to check the information field of the received section. Combined with the checksum calculated at the time of reception, the CS checksum received in each table section is normally equal to 0.

If the resulting checksum is not equal to 0, the corresponding MPEG-2 decoder DEC in the receiver ignores the information contained in the table concerned. If an error of this kind is detected by the stream analyzer, the analyzer cannot tell which information in the table is erroneous. In this case, the stream analyzer signals an error by producing a cyclic redundancy check error parameter CRCE in response to a CS checksum resulting from one of the previously mentioned tables PAT, PMT, CAT, NIT, EIT, SDT, BAT and TOT not equal to 0.

7) As already stated, the PCR program clock reference defines the clock specific to a given audiovisual service program. This clock reference is used to link the internal clock of the respective decoder DEC in the receiver RE to the internal clock of the respective coder COD in the emitter EM. Each PMT program map table indicates the PID descriptors of the packets containing the PCR clock reference for the respective program.

The MPEG-2 standard tolerates discontinuities in the values of the PCR clock reference provided that the discontinuities are indicated in the optional AE adaptation field of the packet concerned, which eliminates error messages relating to the PCR check references in the case of a change of audiovisual service program due to remultiplexing the transport stream.

A seventh parameter PCRE relating to a program clock reference error parameter is supplied by the stream analyzer in response to either of the following two events:

the time interval between two consecutive packets containing a PCR of a given program exceeds a second time threshold ST2 typically equal to 100 ms without this being signaled in the optional AF adaptation field; or the time interval between receiving two packets containing a PCR clock reference of the given program exceeds a third threshold ST3 typically equal to 40 ms.

8–9) Each of the NIT network information and SDT service description tables is inserted into the TS transport packet stream as additional data and contains information relating to the current date and the description of a television program in a network and/or programs in other networks, etc. Each of these tables is transmitted in the form of elementary packets TE of section type and is present periodically in the stream.

The signaling and service channel tables do not all have a different identifier PID: for example, the packets of the universal TDT Time and Date Tables and the TOT tables have identical PID identifiers. These tables are distinguished by their table identifier, which enables MPEG-2 decoders to operate in accordance with the digital video broadcasting (DVB) standards.

The identifier of the NIT table is correct if it is equal to '40' or '41' in hexadecimal, and the identifier of the SDT table is correct if it is equal to '42' or '46' in hexadecimal.

Eighth and ninth table error parameters NITE and SDTE are produced by the stream analyzer respectively in response to an error relating to the NIT table and an error relating to the SDT table, i.e. in response to the following event relating to each of the NIT and SDT tables:

a packet with a PID identifier conforming to the signaling and service channel identifiers is detected but with an erroneous identifier not equal to '40' or '41' for the NIT table or not equal to '42' or '46' for the SDT table; or the time interval between two sections (elementary packets) of the NIT table with the correct identifier '40' or '41' exceeds a threshold which is typically 10 s for the NIT table, or the time interval between two sections of the SDT table with the correct identifier '42' or '46' exceeds a threshold which is typically 2 s for the SDT table.

In accordance with the invention, the measurer associated with the stream analyzer monitors the quality of service in the digital television signal transmission link LI by means of three parameters depending on the nine analysis parameters of the ETR 290 standard previously referred to: a parameter of Synchronization of Services SS, a parameter of Degradation of Services DS and a parameter of strong Degradations FD.

The synchronization-of-services parameter SS is defined as the maximum of the variations in the transport stream synchronization loss parameter TSSL, the program association table error parameter PATE, and the program map table error parameter PMTE during a predetermined period $\Delta t$. For example, each of the aforementioned three analysis parameters TSSL, PATE and PMTE is supplied on each analysis cycle of the TS packets of approximate duration $dt=1$ s by the stream analyzer and the measurer produces the maximum of the variation in these three analysis parameters as the parameter SS approximately every $\Delta t=10$ s. The parameter SS indicates if the equipment units upstream of the measurer/analyzer in the link LI can synchronize to the transport stream initially in the emitted multiplex signal SME. If the parameter SS is not equal to 0, this indicates that the equipment units cannot synchronize and the audiovisual program services are absent in the link.

The degradations-of-services parameter DS is defined as the maximum of the variations in the continuity count error parameter CCE and the transport error parameter TE during the period $\Delta t$. The parameter DS enables accurate evaluation of the level of degradation of services. In the absence of degradation of services, the parameter DS has a null value. The level of degradation of the quality of service is proportional to the value of the parameter DS.

Figure 3:
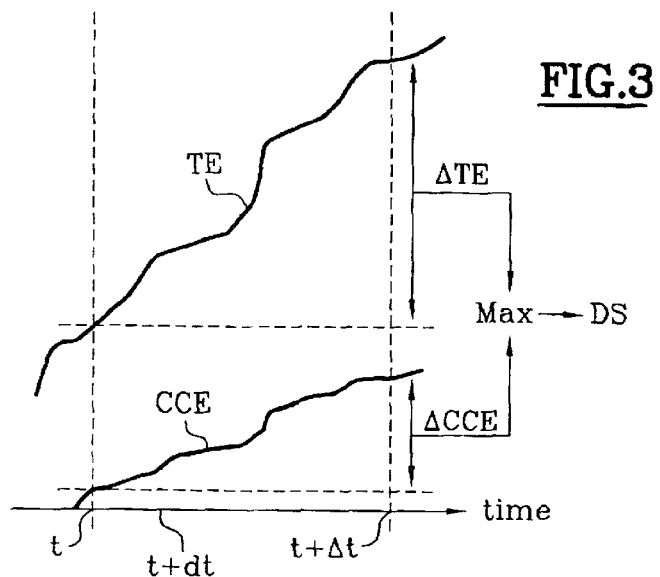
FIG. 3 shows two graphs of variations in parameters supplied by an analyzer during a predetermined period in order to deduce therefrom one of three parameters in accordance with the invention.

For example, FIG. 3 shows two graphs of the variations $\Delta CCE$ and $\Delta TE$ of the analysis parameters CCE and TE supplied by the analyzer during a time interval $\Delta t$ in order to deduce therefrom their maximum which is equal to the degradations-of-services parameter (DS) according to the invention. For example, if at time t $CCE(t)=10$ and $TE(t)=2$, and if at the end of the period $t+\Delta t$, $CCE(t+\Delta t)=14$ and $TE(t+\Delta t)=11$, then the measurer calculates $$\Delta CCE=CCE(t+\Delta t)-CCE(t)=4,$$

$$\Delta TE=TE(t+\Delta t)-TE(t)=9$$

i.e. $DS=max[\Delta CCE, \Delta TE]=9$

The strong degradations parameter FD is defined as the maximum of the variations in the cyclic redundancy check error parameter CRCE, the program clock reference error parameter PCR, the network information table error parameter NITE and the service description table error parameter SDTE during the period $\Delta t$. The parameter FD indicates the presence of very serious degradation and is highly complementary to the parameter DS. A null value of the parameter FD indicates the absence of strong degradations in the link. The non-null value of the parameter FD indicates the level to which there are strong degradations in the link.

Figure 4:
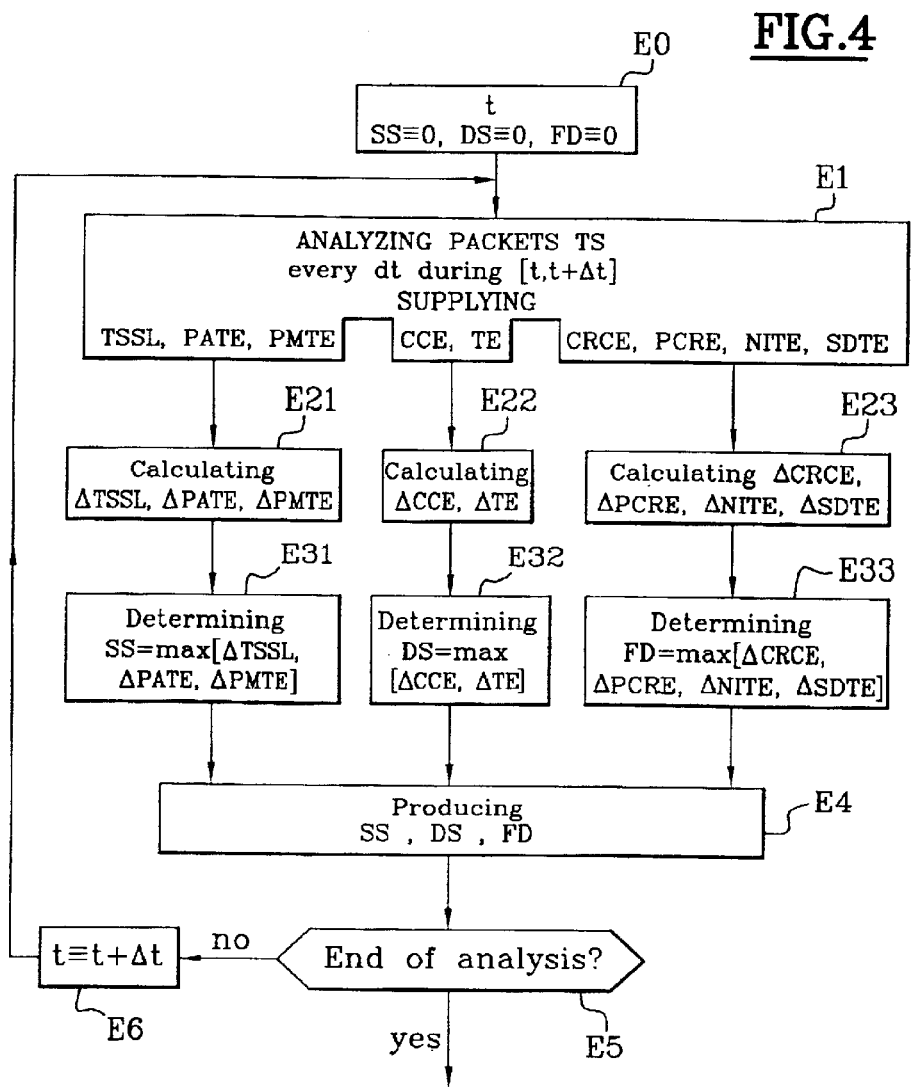
FIG. 4 is an algorithm illustrating a quality of service surveillance method according to the invention.

As shown in FIG. 4, the quality-of-service surveillance method in the link LI essentially includes steps E0 to E6.

In the initial step E0, a time variable t is fixed at an initial time for analysis and measurement of parameters, and variables SS, DS and FD corresponding to the three parameters according to the invention are set to zero.

In each elementary packet analysis cycle dt, typically of approximately one second duration, during step E1, the analyzer analyzes the transport stream (TS) packets, for example in the multiplex signal SME when it is at the position AM1 (FIG. 1), or in the link LI when it is at the position AM2, or in the receive multiplex signal SMR when it is at the position AM3. In each analysis cycle dt, the analyzer supplies the nine analysis parameters TSSL, PATE, PMTE, CCE, TE, CRCE, PCRE, NITE and SDTE.

Then, after the step E1, the method includes three parallel branches comprising similar steps E21–E31, E22–E32 and E23–E33 so that the measurer can calculate simultaneously the maxima of the variations in the analysis parameters on which respectively depend the three parameters SS, DS and FD according to the invention, and to be more precise for each of the three parameters of the invention, the maximum of the variations in the analysis parameters between time t and the preceding time $t-\Delta t$. Accordingly, in the first branch E21–E31, the variations ATSSL, APATE and APMTE of the respective parameters TSSL, PATE and PMTE are calculated and the maximum of these three variations determines the first parameter according to the nrvention, i.e. the synchronization-of-service parameter SS. In the second branch E22–E32, the variations ACCE and ATE in the respective parameters CCE and TE are calculated and the maximum of these two variations determines the second parameter according to the invention, i.e. the degradations-of-services parameter DS. In the third branch E23–E33, the variations ΔCRCE, Δ PCRE, ΔNITE and ΔSDTE of the last four parameters CRCE, PCRE, NITE and SDTE are calculated, and the maximum of these four variations determines the third parameter according to the invention (FD).

After the preceding three parallel sets of steps, at the end of the period Δt, the three measured parameters of the invention SS, DS and FD are produced, for example, to be transmitted and/or displayed and/or printed in a step E4.

Then, if the analysis is continued in step E5, the measurement period Δt is repeated by incrementing the variable t by Δt in step E6.

Figure 5:
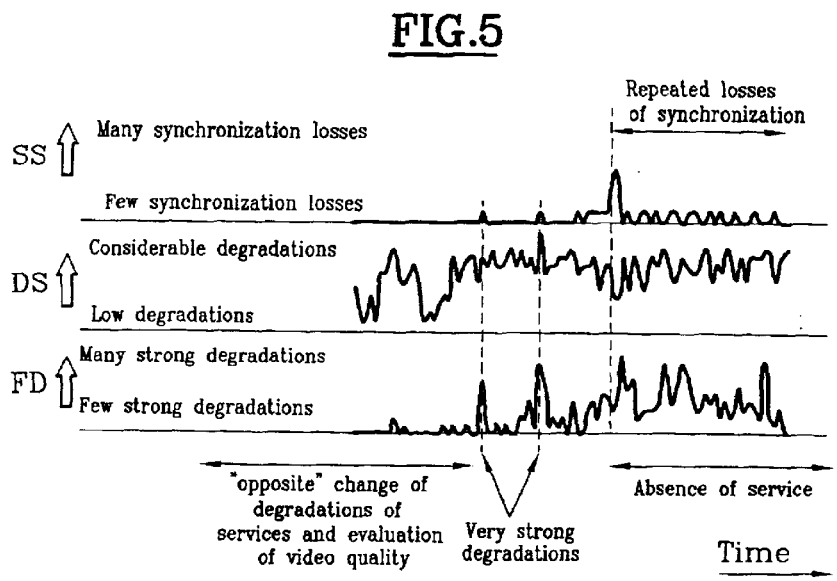
FIG. 5 shows three graphs of variations in parameters supplied by a quality-of-service measuring system according to the invention.

FIG. 5 shows by way of example the variations in the three parameters of the invention SS, DS and FD as a function of time. Note that:

the synchronization-of-services parameter SS is repeated, a service cannot be established and it is impossible to evaluate a quality of service;

the degradation-of-services parameter DS changes in the opposite sense to the level of quality of service: when one increases, the other decreases; and peaks in the variation in the strong degradations parameter FD signal very low levels of quality of service.

What is claimed is:

1. A quality-of-service surveillance method for use in a transmission link of digital television signal, including cyclic analysis of transport stream packets constituting the signal to produce a predetermined number of analysis parameters, comprising:
   (a) preselecting first analysis parameters and second analysis parameters from among said analysis parameters, and
   (b) periodically determining a maximum of variations in the first analysis parameters and a maximum of variations in the second analysis parameters thereby producing respectively a first parameter representative of a synchronization relative to equipment units in said link and a second representative of a degradation of services in said link.

2. A method according to claim 1, wherein said first parameter representative of a synchronization of equipment units depends on three analysis parameters which are a transport stream synchronization loss parameter, a program association table error parameter and a program map table error parameter.

3. A method according to claim 1, wherein the second parameter representative of a degradation of services depends on two analysis parameters which are a continuity count error parameter and a transport error parameter.

4. A method according to claim 1, wherein the second parameter representative of a degradation of services depends on four analysis parameters which are a cyclic redundancy check error parameter, a program clock reference error parameter, a network information table error parameter and a service description table error parameter.

5. A method according to claim 1, wherein two second parameters representative of a degradation of services are determined, one of said second parameters depending on two analysis parameters which are a continuity count error parameter and a transport error parameter, and the other of said second parameters depending on four analysis parameters which are a cyclic redundancy code error parameter, a program code reference error parameter, a network information table error parameter and a service description table error parameter.

6. A method according to claim 1, wherein a cycle of said analysis of transport stream packets has a duration of approximately one second, and said first parameter and second parameter respectively representative of synchronization of equipment units and of a degradation of services are produced during a period which is approximately ten seconds.

* * * * *